United States Patent [19]

Nidle

[11] Patent Number: 4,475,578

[45] Date of Patent: Oct. 9, 1984

[54] TIRE VALVE ASSEMBLY

[75] Inventor: Charles Nidle, Durham, N.C.

[73] Assignee: Eaton Corporation, Cleveland, Ohio

[21] Appl. No.: 433,349

[22] Filed: Oct. 8, 1982

[51] Int. Cl.$^3$ .............................................. B60C 29/00
[52] U.S. Cl. .................. 152/415; 137/234.5;
152/427; 251/321; 251/368; 285/162
[58] Field of Search ............... 192/427, 428, 415, 429,
192/430; 137/223, 234.5, 543.23; 251/321–323,
368; 285/162, 338; 138/89.3, 45, 46

[56] References Cited

U.S. PATENT DOCUMENTS

| | | | |
|---|---|---|---|
| 1,313,553 | 8/1919 | Nielsen | 152/427 X |
| 2,822,817 | 2/1958 | Benzel | 137/223 |
| 3,032,091 | 5/1962 | McCord | 192/427 |
| 3,158,165 | 11/1964 | Benson et al. | 137/234.5 X |
| 3,407,832 | 10/1968 | Lytz | 137/223 |
| 3,568,708 | 3/1971 | Ashman | 152/427 X |
| 4,064,923 | 12/1977 | German et al. | 152/415 X |

Primary Examiner—William A. Powell
Assistant Examiner—Thomas Bokan
Attorney, Agent, or Firm—F. M. Sajovec; C. H. Grace

[57] ABSTRACT

A tire valve assembly (10) which includes a valve stem (11), a combined actuating pin and valve element (14), a spring (18) and a retainer (16). A valve seat (19) is formed as part of the stem, and the combined pin and valve element is made of a material which is sufficiently rigid to function as an actuating element yet is sufficiently resilient to serve as an effective seal.

7 Claims, 5 Drawing Figures 4,475,578

TIRE VALVE ASSEMBLY

This invention relates to tire valves, and more particularly to a combined valve stem and valve assembly of exceptionally simple construction.

A conventional tire valve assembly for automotive use includes a valve stem which is snapped in place in a hole provided in a wheel rim; and a valve core assembly which screws into the valve stem and incorporates a well-known valve element, including a valve seat and sealing element and an actuating pin engageable by a standard inflation fitting on a compressed air inflation hose to open the valve for inflation.

The fabrication of valves of the above type can be rather complex, requiring the machining of very small parts and numerous assembly steps including the assembly of a sealing element to seal the valve core assembly to the valve stem and a sealing element defining the valve element of the core assembly.

Attempts have been made to simplify the above structure by using elastomeric materials which function as both a seal element and an actuating member; however, these have not been completely successful due to the fact that many materials which have the strength and rigidity to function as valve actuating member or pin have not been capable of forming an effective seal, and, conversely, materials which exhibit good sealing qualities do not have sufficient rigidity to serve as an actuating member. Since the valve assembly must be interchangeable with currently used assemblies, simply enlarging the components is not practical.

Another problem which has hindered the development of a simplified valve is that upon initial installation of a tire on a wheel the air flow rate must be sufficient to set the bead of the tire against the wheel rim. When conventional valves are used the core of the valve must be removed in order for the stem to pass sufficient air. Accordingly, any valve assembly in which the stem and the valve element are integral must be capable of passing more air than a conventional removable valve core while still meeting all other requirements of the valve assembly.

The present invention provides a tire valve assembly which combines the valve stem, the valve element, and an actuating pin into a single unit including only four components, the assembly of which requires no threaded fastening. The assembly includes a valve stem which is adapted for snap-in installation in a wheel rim in conjunction with an elastomeric grommet, a combined actuating pin and valve element, a spring, and a retainer. The combined valve element and actuator and the retainer are designed to provide a rigid structure while passing sufficient air to allow a tire to be inflated through the valve at initial assembly for the purpose of setting the bead of the tire on the wheel rim.

Other features and advantages of the invention will be apparent from the following description when taken in connection with the accompanying drawing, wherein.

Figure 1:
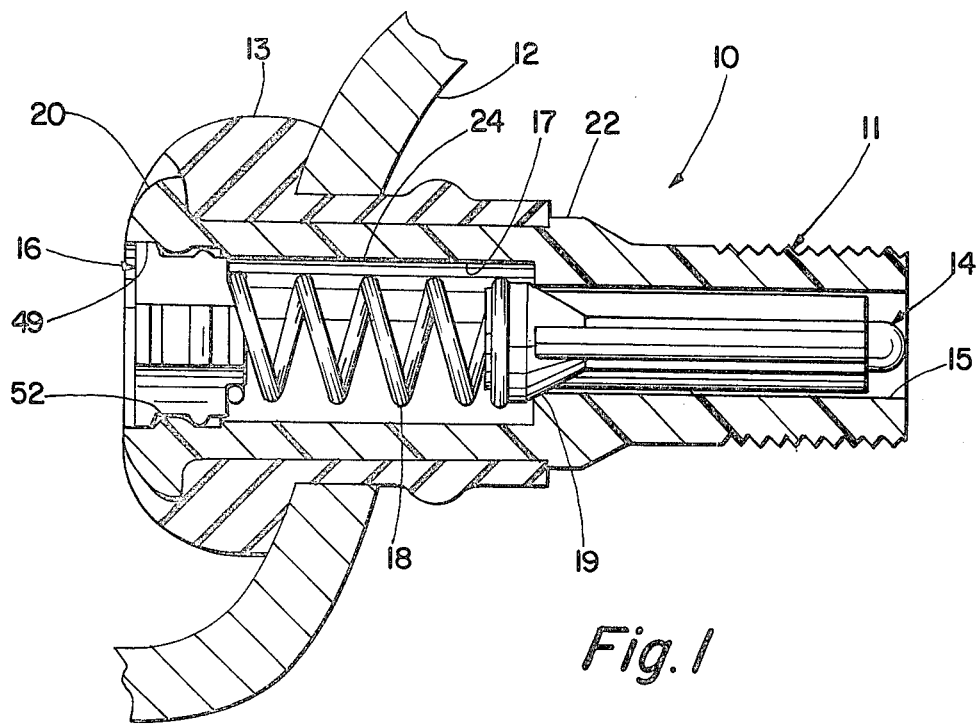
FIG. 1 is a cross sectional view of the invention installed in a wheel rim.

Referring to FIG. 1, there is illustrated a tire valve assembly 10 comprising a stem 11 adapted for insertion into a hole provided in the rim 12 of a vehicle wheel, a pin and seal element 14 received within the stem 11, a retainer 16 which is snapped into engagement with one end of the stem, and a compression spring 18 received between the pin and seal element 14 and the retainer 16.

The stem 11 as illustrated in the preferred embodiment herein is of the type disclosed in U.S. Pat. No. 4,064,923 issued to Dale F. German and Charles Nidle wherein the stem 11 is received within an elastomeric grommet 13 which is received within the rim hole, and a seal is effected between the grommet and the rim and between the grommet and the stem when the stem is inserted into the grommet. To this end, the stem 11 is formed with an inner flange portion 20, an outer flange portion 22, and a grommet-receiving barrel portion 24 between the inner and outer flange portions. In accordance with the above patent, the disclosure of which is incorporated herein by reference, when the stem is inserted into the grommet, the grommet is compressed between the inner and outer flange portions to perform its sealing function.

The stem 11 is formed with a stepped bore including a first bore 15 receiving the pin and seal element 14, and a second, larger bore 17 receiving the retainer 16 and the spring 18, the intersection of the bores defining a conical valve seat 19.

Figure 2:
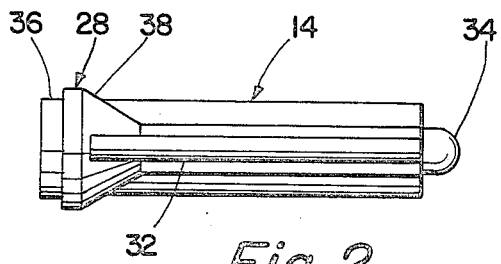
FIG. 2 is a side elevation view of the actuating pin and valve element of the invention.
Figure 3:
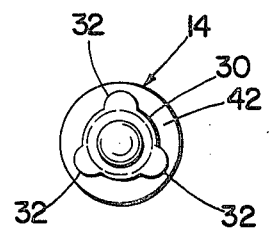
FIG. 3 is an end elevation view of the structure shown in FIG. 2.

Referring particularly to FIGS. 2 and 3, the pin and seal element 14 preferably comprises a single piece of an elastomeric material which is molded in a particular shape to permit sufficient air flow when the seal element is in its open position, which is of sufficient strength to function as the actuating pin of the valve element, and which also forms an effective seal. Specifically, the member 14 comprises a generally cylindrical member having a valve element 28 formed adjacent one end thereof, an elongated barrel portion 30 with a plurality of radial projections or ribs 32 formed thereon and extending along its length, a relatively small diameter actuating pin portion 34 extending axially from the barrel 30, and an intermediate diameter spring retaining portion 36 formed adjacent the valve element at the end opposite the actuating pin portion.

The valve element 28 is formed with a conical sealing section 38 which is engageable with the seat 19 in the stem 11. In the illustrative embodiment there are three ribs 32 spaced about the circumference of barrel portion 30. The projections give rigidity to the pin and seal structure while serving as a means to guide the element within the bore 15. At the same time the open air flow areas 42 between the ribs contribute to provide sufficient air flow through the valve assembly to permit a tire to be inflated through the valve for the purpose of initially setting the tire bead to the rim.

Figure 4:
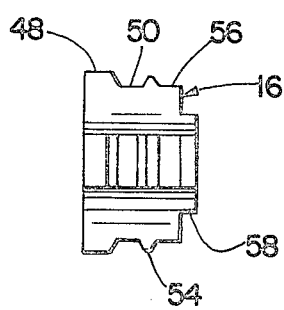
FIG. 4 is a side elevation view of the retainer of the invention.
Figure 5:
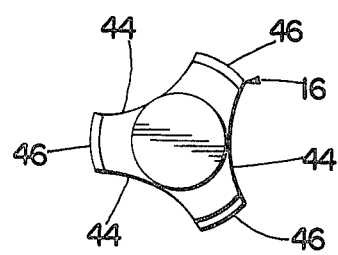
FIG. 5 is an end elevation view of the structure shown in FIG. 4.

Referring to FIGS. 4 and 5, the retainer 16 is also configured to provide the free flow of air therethrough while fulfilling its function as a reaction member for the spring 18 and to retain the spring and the pin and seal element 14 within the stem 11. To provide ample air space between the retainer and the bore 17 of the stem 11, the retainer 16 is essentially a solid cylinder with three concave axial depressions 44 formed therein, leaving three radial walls 46 engageable with the wall of bore 17. To provide ease of assembly along with retention within the bore 17 the stem and the retainer are designed for "snap-in" assembly. Specifically, the retainer is formed with a first diameter 48 which is a close sliding fit within a counterbore 49 formed in the value stem co-axially with bore 17 of stem 11, a groove 50 which is engageable by a lip 52 extending inwardly from the counterbore, an outwardly extending lip 54, a second diameter 56, and a third diameter 58 which serves to retain one end of the spring 18. The major diameter of the lip 54 is slightly greater than the minor diameter of lip 52, and an entry angle is formed on the forward end (right end as viewed in FIGS. 1 and 4) to facilitate the slight displacement of the lips when the retainer is inserted into the stem to engage the lip 52 on the stem with the groove 50. Once the retainer is snapped into the position shown in FIG. 1 it will not be displaced by the normal compressive force applied to spring 18 by a gauge or filling nozzle acting on the pin and seal 14.

To assemble the valve 10, the pin and seal element 14 and the spring 18 are inserted into the stem 11, and the retainer is then snapped into place. Since the air passages provided past the pin and seal and the retainer are sufficient to permit bead setting with the valve in place, there is no need to disassemble the valve during normal usage. More specifically, a standard valve stem with the core removed will pass air at a rate of about 10 SCFM, while actual tests have shown that the present valve when fully assembled will pass air at a rate of at least 11 SCFM.

An important factor in making a valve of the type described above practical, both functionally and for reasons of cost, is the selection of elastomeric materials having the optimum physical properties for the application. In the design of the pin and seal element 14 in particular it is critical to use a material which offers good sealing properties while having sufficient rigidity to serve as the actuating element which is engaged by a pressure gauge or by the filling nozzle on an air hose. In order to fulfill these requirements it is considered that the material should have the following properties:

| Property | ASTM Test | Units | Value |
| --- | --- | --- | --- |
| Hardness, Durometer | D-2240 | Points | 50–60 |
| Tensile Strength | D-412 | psi | 3000 (min) |
| Resilience, Bashore | — | % | 48 (min) |
| Flexural Modulus | D-790 | psi | 30,000 (min) |

In actual practice it has been found that a polyester elastomer material called Hytrel, which is a trademark of DuPont Company, and specifically Hytrel 5526 possesses a combination of the above properties which makes it particularly useful as a material from which the pin and seal element 14 can be fabricated. It is expected that other elastomeric materials having the above minimum strength, resilience and flexural properties, and having a hardness between 40–80 will also perform well in this application.

The material used to fabricate the stem 11 and the retainer 16 is not considered to be as critical as the material used for the pin and seal element; however, it can be appreciated that the materials must be compatible with each other and with the pin and seal element, and that the stem in particular is subjected to the same environmental conditions as the vehicle wheel, and thus it must withstand some impact loads in normal use. There are a number of non-metallic materials which are suitable for this application; however, it has been found that in addition to Hytrel, the acetal resin Delrin, which is a trademark of the Dupont Company, is particularly useful for these applications. In any event, the material used for the stem should be at least as hard as the material used for the pin and seal element.

I claim:

1. A tire valve assembly comprising a hollow unitary stem member; means surrounding said stem member for mounting said stem member within a rim hole of a vehicle wheel with the stem member extending outward of the rim, an elongated member received within said stem member, a seal element formed on said elongated member as an integral part thereof and sealingly engageable with a portion of said stem member to prevent the passage of air through said stem member, an actuating pin element formed on said elongated member as an integral part thereof and engageable by means external to said stem member to move said elongated member to a position wherein said seal element is out of engagement with said portion of said stem member, a retainer received within said stem member, and a compression spring acting between said retainer and said elongated member, said elongated member being formed of an elastomeric material with a hardness of between 40 and 80 durometer when subjected to ASTM Test D-2240, a tensile strength of at least 3000 psi when subjected to ASTM Test D-412, and a Bashore resilience of at least 48 percent.

2. Apparatus as claimed in claim 1, in which said elongated member is formed of a polyester elastomer.

3. Apparatus as claimed in claim 1, in which said stem member is formed of a material with a hardness at least as great as the hardness of said elongated member.

4. Apparatus as claimed in claim 1, in which said elongated member comprises a substantially cylindrical member having a substantially conical sealing surface formed adjacent one end thereof, and a plurality of radial ribs formed thereon and extending axially along said cylindrical member from said conical sealing surface to a point spaced inwardly from the end thereof, the remaining length of said cylindrical member defining said pin element.

5. Apparatus as claimed in claim 1, in which said stem member comprises a substantially cylindrical member having a first bore formed therein, and a second larger coaxial bore formed therein, the intersection of said first and second bores defining a valve seat engageable by the conical sealing surface formed on said elongated member.

6. Apparatus as claimed in claim 5, in which said retainer comprises a substantially cylindrical member having a plurality of axially extending channels formed therein to define air passages past said retainer and a circumferential groove formed therein, said stem member having a coaxial counterbore intersecting said second bore and a radially inwardly directed lip formed in said counterbore, said lip interfitting with said groove to restrict axial movement of said retainer within said stem member.

7. Apparatus as claimed in claim 6, including a first cylindrical projection formed on said elongated member and a second cylindrical projection formed on said retainer, the diameters of said first and second cylindrical projections being slightly smaller than the internal diameter of said compression spring, said projections serving to radially position said spring within said stem member.

* * * * *